(12) United States Patent
Burns et al.

(10) Patent No.: US 8,784,585 B2
(45) Date of Patent: *Jul. 22, 2014

(54) AUTOIGNITION COMPOSITIONS

(75) Inventors: Sean P. Burns, Almont, MI (US);
Deborah L. Hordos, Troy, MI (US);
Jason Newell, Lasalle (CA)

(73) Assignee: TK Holdings Inc., Armada, MI (US)

( * ) Notice: Subject to any disclaimer, the term of this patent is extended or adjusted under 35 U.S.C. 154(b) by 1004 days.

This patent is subject to a terminal disclaimer.

(21) Appl. No.: 11/479,493

(22) Filed: Jun. 30, 2006

(65) Prior Publication Data

US 2007/0113940 A1    May 24, 2007

Related U.S. Application Data

(60) Provisional application No. 60/695,925, filed on Jun. 30, 2005.

(51) Int. Cl.
| C06B 29/00 | (2006.01) |
| C06B 29/02 | (2006.01) |
| D03D 23/00 | (2006.01) |
| D03D 43/00 | (2006.01) |

(52) U.S. Cl.
USPC ......... 149/77; 149/75; 149/106.6; 149/108.8; 149/109.2; 149/109.4

(58) Field of Classification Search
USPC .............. 149/38, 75, 77, 108.6, 108.8, 109.2, 149/109.4
See application file for complete search history.

(56) References Cited

U.S. PATENT DOCUMENTS

| 2,985,979 A | 5/1961 | Doyle et al. ...................... 42/96 |
| 3,111,899 A | 11/1963 | Tiedemann ................... 102/342 |
| 3,558,285 A | 1/1971 | Ciccone et al. ................. 23/281 |
| 3,711,115 A | 1/1973 | Lohr ............................. 280/150 |
| 3,785,149 A | 1/1974 | Timmerman ................... 60/205 |
| 3,787,010 A | 1/1974 | Meranshian et al. ......... 244/146 |
| 3,849,923 A | 11/1974 | Hawkins, Jr. ..................... 42/96 |
| 3,862,866 A | 1/1975 | Timmerman et al. ........... 149/21 |
| 3,880,595 A | 4/1975 | Timmerman ................... 23/281 |
| 3,902,934 A | 9/1975 | Timmerman .................... 149/83 |
| 3,923,884 A | 12/1975 | Yonemitsu et al. ........... 260/536 |
| 4,244,295 A | 1/1981 | Shaffer .......................... 102/205 |
| 4,301,732 A | 11/1981 | Van Sickle ..................... 102/430 |
| 4,337,352 A | 6/1982 | Naumann ....................... 562/401 |
| 5,221,765 A | 6/1993 | Patil et al. ..................... 562/401 |

(Continued)

FOREIGN PATENT DOCUMENTS

| DE | 199 50 311 A1 | 10/1999 | ............... A61K 1/00 |
| WO | WO 97/29151 | 8/1997 | ............... C08K 3/00 |

OTHER PUBLICATIONS

PCT Written Opinion, PCT/US05/31526, dated Apr. 5, 2006.
PCT Written Opinion, PCT/US06/11950 dated Sep. 22, 2006.

(Continued)

*Primary Examiner* — James McDonough
(74) *Attorney, Agent, or Firm* — L.C. Begin & Associates, PLLC.

(57) ABSTRACT

A gas generator 10 includes an autoignition composition that contains an alkali metal chlorate such as potassium chlorate as an oxidizer, a carboxylic acid such as DL-tartaric acid as a fuel, and a desiccant in operable communication therewith. Gas generating systems 180 such as vehicle occupant protection systems 180, containing the gas generator 10, are also provided.

6 Claims, 1 Drawing Sheet

(56) References Cited

U.S. PATENT DOCUMENTS

| | | | |
|---|---|---|---|
| 5,380,380 A | 1/1995 | Poole et al. | 149/22 |
| 5,518,054 A | 5/1996 | Mitson et al. | 149/35 |
| 5,538,568 A | 7/1996 | Taylor et al. | 149/70 |
| 5,567,905 A | 10/1996 | Barnes et al. | 102/289 |
| 5,670,740 A * | 9/1997 | Barnes et al. | 149/62 |
| 5,682,014 A | 10/1997 | Highsmith et al. | 149/36 |
| 5,763,821 A | 6/1998 | Wheatley | 149/19.5 |
| 5,854,442 A | 12/1998 | Scheffee et al. | 149/18 |
| 5,861,571 A | 1/1999 | Scheffee et al. | 102/288 |
| 6,077,371 A | 6/2000 | Lundstrom et al. | 149/37 |
| 6,464,254 B2 | 10/2002 | Chikaraishi et al. | 280/741 |
| 6,517,647 B1 * | 2/2003 | Yamato | 149/45 |
| 6,588,797 B1 | 7/2003 | Blomquist | 280/741 |
| 6,682,616 B1 | 1/2004 | Yamato et al. | 149/45 |
| 6,752,421 B2 | 6/2004 | Khandhadia et al. | 280/741 |
| 6,779,812 B2 | 8/2004 | Ishida et al. | 280/741 |
| 6,800,154 B1 | 10/2004 | Carey et al. | 149/2 |
| 6,918,976 B2 | 7/2005 | Sato et al. | 149/19.1 |
| 7,005,459 B2 | 2/2006 | Hekal | 523/102 |
| 7,134,690 B2 | 11/2006 | Furusawa et al. | 280/739 |
| 2003/0024618 A1 | 2/2003 | Wu et al. | 149/19.7 |
| 2004/0232679 A1 | 11/2004 | Kubo et al. | 280/741 |
| 2006/0220362 A1 | 10/2006 | Hordos | |
| 2007/0044675 A1 | 3/2007 | Burns et al. | 102/530 |
| 2007/0084532 A1 | 4/2007 | Burns et al. | 149/24 |
| 2008/0149232 A1 | 6/2008 | Newell | 149/109.2 |

OTHER PUBLICATIONS

PCT Written Opinion, PCT/US06/38955, dated Mar. 30, 2007.

PCT Written Opinion, PCT/US07/25892, dated Apr. 24, 2008.

Office Action for U.S. Appl. No. 11/218,191, filed Aug. 31, 2005 dated for Jun. 4, 2007.

Office Action for U.S. Appl. No. 11/218,191, filed Aug. 31, 2005 dated for Nov. 26, 2007.

Office Action for U.S. Appl. No. 11/218,191, filed Aug. 31, 2005 dated for Feb. 14, 2008.

Office Action for U.S. Appl. No. 11/395,477, filed Mar. 30, 2006 dated for Aug. 23, 2005.

Office Action for U.S. Appl. No. 11/395,477, filed Mar. 30, 2006 dated for Feb. 14, 2007.

Office Action for U.S. Appl. No. 11/395,477, filed Mar. 30, 2006 dated for Sep. 13, 2007.

Office Action for U.S. Appl. No. 11/395,477, filed Mar. 30, 2006 dated for May 24, 2007.

Office Action for U.S. Appl. No. 11/395,477, filed Mar. 30, 2006 dated for Mar. 27, 2008.

U.S. Appl. No. 11/395,477.

U.S. Appl. No. 11/218,191.

U.S. Appl. No. 11/542,302.

Office Action U.S. Appl. No. 12/924,521, filed Sep. 29, 2010. Mailed Nov. 21, 2011 (02121).

Office Action U.S. Appl. No. 12/002,701, filed Dec. 17, 2007, Mailed Dec. 13, 2011 (01166).

Office Action for U.S. Appl. No. 12/924,521, filed Sep. 29, 2010, mailed Jan. 14, 2014.

Office Action U.S. Appl. No. 11/218,191, filed Aug. 31, 2005, Mailed Jul. 13, 2012 (98).

\* cited by examiner

AUTOIGNITION COMPOSITIONS

CROSS-REFERENCE TO RELATED APPLICATIONS

This application claims the benefit of U.S. Provisional Application Ser. No. 60/695,925 filed on Jun. 30, 2005.

TECHNICAL FIELD

The present invention relates generally to gas generating systems, and to autoignition compositions employed in gas generator devices for automotive restraint systems, for example.

BACKGROUND OF THE INVENTION

The present invention relates to autoignition compositions that upon ignition provide the flame front and pressure front necessary to safely ignite gas generant compositions in combustible communication therewith. As known in the art, gas generators are typically provided with an autoignition composition that in the event of a fire, ignites responsive to a desired threshold temperature. As a result, the gas generant is ignited prior to melting for example, thereby safely igniting the main gas generant composition to inhibit or prevent the likelihood of an explosive event once the gas generant begins to combust.

The use of potassium chlorate within an autoignition composition has been considered given the autoignition properties of this oxidizer. Furthermore, carboxylic acid in combination with potassium chlorate typically provides a desired autoignition temperature of 200 degrees Celsius or less. Nevertheless, these types of compositions sometimes decompose given their hygroscopicity or tendency to absorb moisture. Unsuccessful attempts have been made to inhibit moisture retention or uptake within these compositions without adversely affecting the desired autoignition temperature.

SUMMARY OF THE INVENTION

The above-referenced concerns are resolved by gas generating systems including an autoignition composition containing an alkali metal chlorate, such as potassium chlorate, a carboxylic acid as a fuel, and a desiccant or moisture retaining material combined with the oxidizer and fuel. Other constituents including extrusion aids, such as fumed silica and/or graphite, may be included in relatively small amounts.

In further accordance with the present invention, a gas generator and a vehicle occupant protection system incorporating the autoignition system are also included.

DETAILED DESCRIPTION OF THE PREFERRED EMBODIMENT(S)

Figure 1:
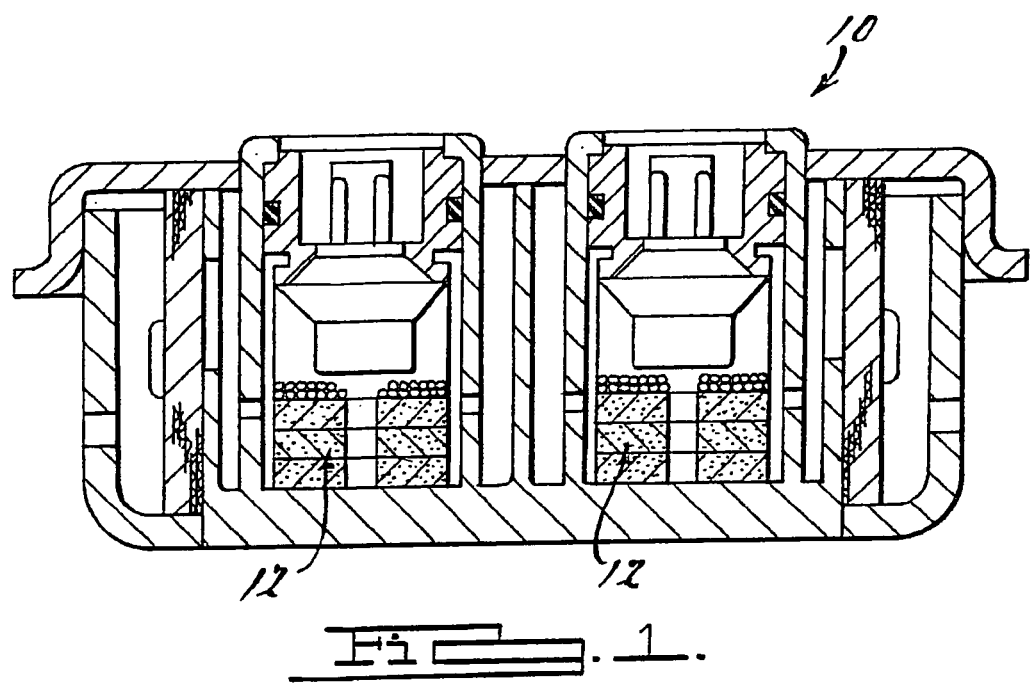
FIG. 1 is a cross-sectional side view showing the general structure of an inflator in accordance with the present invention.

The present compositions contain an alkali metal chlorate oxidizer such as potassium chlorate at about 25-75%, and more preferably about 40-60%, by weight of the total composition, a carboxylic acid as a fuel at about 25-75%, and more preferably about 30-40%, by weight of the total composition, and a desiccant at about 5-35%, and more preferably about 10-30%, by weight of the total composition. Extrusion aids or processing additives such as graphite or fumed silica may be added in relatively smaller amounts, such as 0.1-2% by weight of the total composition for example. It has been found that the decomposition typically identified in other potassium chlorate/carboxylic acid compositions that are employed as autoignition compositions is mitigated or eliminated by including a desiccant in the autoignition composition.

Carboxylic acids may be selected from the group including tartaric acid and its isomers, succinic acid, glutamic acid, adipic acid, and mucic acid, and mixtures thereof. DL-tartaric acid is particularly preferred. The present compositions may also include processing additives such as flow agents and lubricants common in the art such as fumed silica and graphite. The desiccant may be any material that will absorb or react with water to remove it from the other components in the autoignition mixture. Exemplary desiccants are activated or hydrated calcium sulfate (DRIERITE®), clay, silica gel, calcium oxide, and zeolites or molecular sieves. Zeolites, as shown in the tables, are particularly effective in assuring an autoignition temperature at or below 200 C, and also in minimizing the mass differential of an autoignition composition before and after heat aging as defined below. All compositional constituents are available from Sigma-Aldrich, or other known suppliers.

The oxidizer generally contains potassium chlorate, but may also contain one or more other alkali metal chlorates.

EXAMPLE 1

Mixtures of 45% potassium chlorate, 30% DL-tartaric acid, and 25% desiccant were made by grinding in a vibratory grinder, the percentages stated by weight of the total composition. The mixtures were designated as 9156. Inactive calcium sulfate was used as a control in this example. The hotplate (HP) autoignition (AI) temperature was measured for each composition. Then each sample was tested for thermal stability by placing about 5 g in a sealed glass vial with an aluminum-lined cap and placing it in a chamber at 107 C for 648 hours. After aging, the mass loss and HP AI temperature were measured. The samples were observed after aging for a chlorine smell and/or reaction with aluminum in order to indicate evolution of chlorine-containing species during decomposition. A positive reaction with the aluminum was presented as white smut (chlorine corrosion) on the aluminum. The hotplate (HP) autoignition test consisted of an aluminum fixture placed on a laboratory hot plate. The fixture was machined to accommodate a 0.3-0.5 g sample of autoignition material and a thermocouple probe. The tip of the probe was positioned directly below the autoignition composition, between the sample and the hotplate surface. The thermocouple was connected to a digital readout display and the hot plate was turned on to a heating rate of 30-50° C. per minute. The autoignition temperature was recorded as the temperature at which the sample combusted vigorously.

The results are shown below in Table 1. The following indicates the results of the test:

1. Control: Significant mass loss occurred and the AI temperature after aging was too high to be useful. Although acceptable, the autoignition temperature is preferably below 200 C.
2. Exp 1A: Same as the control. It appears that the desiccant did not prevent mass loss after heat aging. As with the other examples, weight loss may be associated with water loss, and also the liberation of chlorine-containing compounds as indicated by the tests indicating chlorine release
3. Exp 1B: Significant mass loss occurred; however, the AI temperature after aging was improved as compared to the control.
4. Exp 1C: Some mass loss and a slightly higher AI temperature after aging.
5. Exp 1D: Similar mass loss as 1C, but the AI temperature after aging was too high.
6. Exp 1E, 1F: There was a small mass gain in these experiments and almost no change in AI temperature after aging. The mass gain is most likely due to uptake of gases from the atmosphere.
7. Exp 1G: There was a small gain and a slight increase in AI temperature after aging. The results of 1E-1G indicate that minimizing the mass differential, from −5.0 to about 5.0 weight percent if possible, results in satisfactory autoignition hot plate temperatures at or less than 200 C, and also in a minimal mass differential. Accordingly, the desiccant must be iteratively selected to produce these results.

Example 1: The desiccant indicated in each sample was intimately mixed with the formulation 9156. Mixtures are mixed as described above. Aging is completed in glass vials with aluminum foil inside screw cap for 648 hours at 107 C.

For each experiment, 5 g of the composition in tablet form were wrapped in aluminum foil and placed with 5 g of desiccant in a sealed glass vial with an aluminum-lined cap. These samples were then placed in a chamber at 107 C for 648 hours. After aging, the mass loss and HP AI temperature were measured. The samples were observed after aging for a chlorine smell and/or reaction with aluminum in order to indicate evolution of chlorine-containing species during decomposition. A positive reaction with the aluminum was presented as white smut (chlorine corrosion) on the aluminum.

The results are shown below in Table 2. The following indicates the result of the test:
1. Baseline: The sample ignited on its own during aging due to excessive decomposition in a small volume.
2. Control: Same as the baseline since the calcium sulfate was inactive.
3. Exp 2A: Some mass loss occurred, but the AI temperature was slightly higher after aging. Although relatively higher autoignition temperatures above 200 C may be useful in hybrid inflators for example, the autoignition temperature of autoignition compositions within pyrotechnic inflators is preferably below 200 C.
4. Exp 2B: Similar mass loss as 2A, but no change in the AI temperature.

TABLE 1

| | Experiment | | | | | | | |
|---|---|---|---|---|---|---|---|---|
| | Control | 1A | 1B | 1C | 1D | 1E | 1F | 1G |
| Additive: | CaSO4 inactive | Clay | DRIERITE CaSO4 | Silica Gel | Zeolite Purmole 3A | CaO | Zeolite 13X | Zeolite Purmol 4ST |
| BASELINE | | | | | | | | |
| Empty vial(g) | 14.0931 | 14.1743 | 14.1437 | 14.0998 | 13.7635 | 13.9366 | 14.1586 | 13.8928 |
| 9156 mixt.(g) | 5.5345 | 5.1519 | 5.3985 | 5.3962 | 5.2362 | 5.2493 | 5.0049 | 5.6696 |
| Total (g) | 24.3145 | 24.0262 | 24.2212 | 23.2286 | 23.6745 | 23.8916 | 23.8666 | 24.2349 |
| Baseline HP C | 180, 181 | 178, 178 | 182 | 181, 182 | 187, 187 | 184, 184 | 182, 183 | 185, 185 |
| POST-AGE | | | | | | | | |
| 9156 mixt. (g) | 3.8748 | 3.52 | 4.1636 | 4.6646 | 4.6746 | 5.2667 | 5.0267 | 5.7291 |
| Alum rxn? | Yes | Yes | Yes | No | No | No | No | No |
| Cl smell? | No | No | Yes | Yes | Yes | No | No | No |
| Mass change based on 9156 | −30.0% | −31.7% | −22.9% | −13.6% | −10.7% | 0.3% | 0.4% | 1.0% |
| Aged HP (C) | >250, >250 | >250, >250 | 210, 208 | 190, 195 | >250, >250 | 182, 181 | 185, 184 | 192, 191 |

EXAMPLE 2

A composition known as 9156DL was made by grinding the raw materials in a vibratory grinder then pressing the powder on a rotary press into tablets of approximately 5/16" diameter and 0.113" thickness with a mass of about 270 mg each. The composition contained about 60% potassium chlorate, 38.5% DL-tartaric acid, 0.5% graphite, and 1.0% fumed silica, the percents stated by weight of the total composition.

5. Exp 2C, 2D, 2E, 2F, 2G: Very small mass loss and essentially no change in AI temperature, indicated very minimal decomposition during aging.

Example 2: The desiccant was provided in vapor contact (but not physical) contact with the 9156DL formulation.

5 g of 9156DL were wrapped in aluminum foil with 5 g of desiccant. Aging was completed in glass vials with aluminum foil inside the screw-cap for about 648 hours at about 107 C.

TABLE 2

| | Experiment | | | | | | | | |
|---|---|---|---|---|---|---|---|---|---|
| | Baseline | Control | 2A | 2B | 2C | 2D | 2E | 2F | 2G |
| Additive | None | CaSO4 inactive | Clay | Silica Gel | DRIERITE CaSO4 | CaO | Zeolite Purmol 4ST | Zeolite 13X | Zeolite Purmol 3A |
| BASELINE | | | | | | | | | |
| Empty vial g | 13.9635 | 13.962 | 14.0065 | 13.99 | 14.168 | 13.980 | 13.9733 | 14.3056 | 14.0793 |
| 9156-R264 g | 5.1423 | 5.0984 | 5.0601 | 5.0904 | 5.1016 | 5.0918 | 5.0968 | 5.1414 | 5.056 |
| Desiccant g | 0 | 5.6239 | 5.0392 | 5.2669 | 5.162 | 5.0853 | 5.2628 | 5.3147 | 5.2097 |

TABLE 2-continued

|  | Experiment | | | | | | | | |
| --- | --- | --- | --- | --- | --- | --- | --- | --- | --- |
|  | Baseline | Control | 2A | 2B | 2C | 2D | 2E | 2F | 2G |
| Total g | 23.9642 | 29.7137 | 29.144 | 29.204 | 29.3701 | 29.127 | 29.4586 | 29.786 | 29.4701 |
| Baseline HP C POST-AGE | 172 | 172 | 172 | 172 | 172 | 172 | 172 | 172 | 172 |
| 9156-R264 g |  |  | 4.6574 | 4.7083 | 5.0486 | 5.0564 | 5.0637 | 5.1103 | 5.0336 |
| Alum rxn? | Ignited In The Oven | Ignited In The Oven | No | No | No | No | No | No | No |
| Cl smell? |  |  | No | Yes | Yes | No | No | No | No |
| Mass change based on 9156DL |  |  | −8.0% | −7.5% | −1.0% | −0.7% | −0.6% | −0.6% | −0.4% |
| Aged HP (C) |  |  | 195, 195 | 179, 184 | 173, 175 | 176, 170 | 170, 172 | 176, 172 | 174, 180 |

The examples and the experiments demonstrate that removal of water from the AI composition is beneficial to reducing the amount of decomposition during thermal aging. It is believed that water is produced during decomposition which then catalyzes further reaction, which produces more water and catalyzes the reaction further. This process continues and decomposition occurs at a high rate. By removing water from the atmosphere and any water that is produced during decomposition, the reaction rate is drastically reduced and the compositions retain a low AI temperature after aging at 107 C. Stated another way, when a desiccant is employed in vapor contact with the autoignition composition, an autoignition composition that has relatively little or no decomposition after aging will exhibit an autoignition hotplate temperature close or substantially equivalent to the AI temperature prior to heat aging. This is exemplified by those compositions that exhibit relatively small amounts of weight loss such as 2C-2G. Note that the use of desiccant in vapor contact, rather than in physical contact with the autoignition composition, apparently results in relatively low weight loss and acceptable autoignition temperatures after heat aging with all of the desiccants tested, that is 2A-2G. In general, both examples and both tables indicate the benefit of providing a desiccant in operable contact with the autoignition composition. When the desiccant is employed in vapor contact with the autoignition composition, the desiccant is provided in amounts iteratively determined to prevent moisture uptake and decomposition of the autoignition composition. For example, the desiccant may typically be provided at or about 10-35 parts of desiccant for every 100 parts of autoignition composition as mixed in this example, and in accordance with the present invention.

It is also believed that the decomposition products, specifically the chlorine-containing species, may interact with other chemical compositions in a negative manner. In a sealed inflator, other propellants are often in vapor communication with the AI material. For example, the chlorine-containing decomposition products may reduce the strength and/or density of an otherwise stable main propellant formulation. This may possibly result in unacceptable performance shifts after environmental conditioning.

The examples show that the desiccant can be added as an intimate part of the composition, or placed only in vapor contact with the AI composition. It is thought that the effectiveness of a particular desiccant is based on its ability to retain gained moisture at elevated temperatures. The examples show that different desiccants affect the decomposition of the AI composition differently. Accordingly, autoignition compositions of the present invention typically perform at optimum levels, even after standard heat aging of over 400 hours.

It will be appreciated that in further accordance with the present invention, gas generators made as known in the art and also vehicle occupant protection systems manufactured as known in the art are also contemplated. As such, autoignition compositions of the present invention are employed in gas generators, seat belt assemblies, and/or vehicle occupant protection systems, all manufactured as known in the art.

Figure 2:
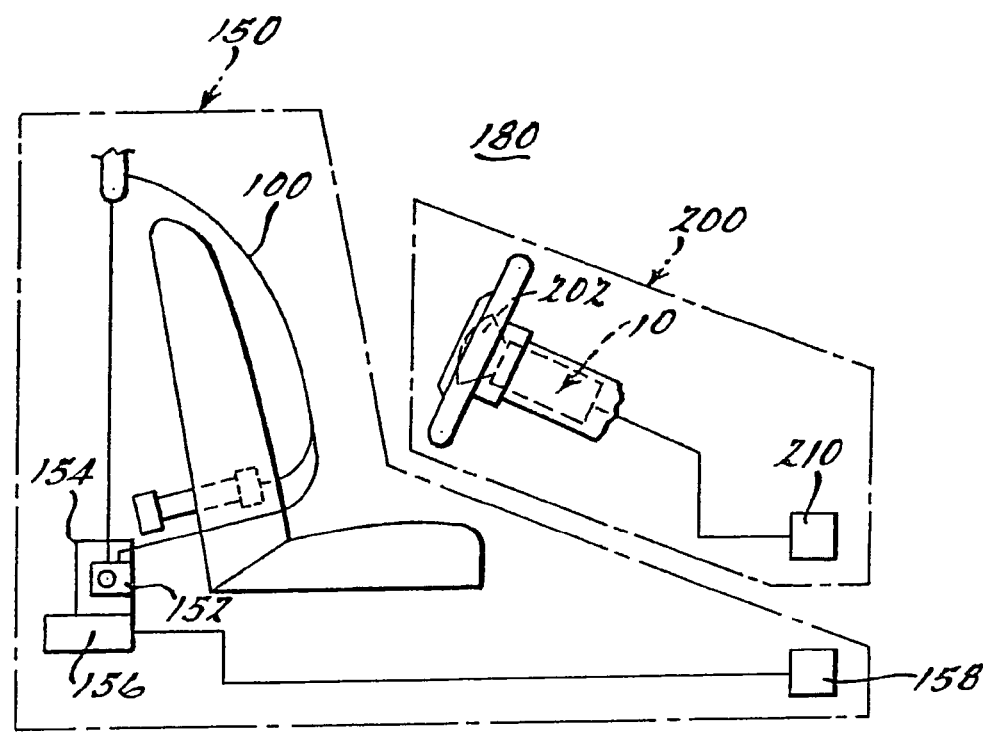
FIG. 2 is a schematic representation of an exemplary vehicle occupant restraint system containing a gas generant composition in accordance with the present invention.

In yet another aspect of the invention, the present compositions may be employed within a gas generating system. For example, as schematically shown in FIG. 2, a vehicle occupant protection system made in a known way contains crash sensors in electrical communication with an airbag inflator in the steering wheel, and also with a seatbelt assembly. The gas generating compositions of the present invention may be employed in both subassemblies within the broader vehicle occupant protection system or gas generating system. More specifically, each gas generator employed in the automotive gas generating system may contain a gas generating composition as described herein.

Extrusion aides may be selected from the group including talc, graphite, borazine [$(BN)_3$], boron nitride, fumed silica, and fumed alumina. The extrusion aid preferably constitutes 0-10% and more preferably constitutes 0-5% of the total composition.

The compositions may be dry or wet mixed using methods known in the art. The various constituents are generally provided in particulate form and mixed to form a uniform mixture with the other gas generant constituents.

It should be noted that all percents given herein are weight percents based on the total weight of the gas generant composition. The chemicals described herein may be supplied by companies such as Aldrich Chemical Company for example.

As shown in FIG. 1, an exemplary inflator incorporates a dual chamber design to tailor the force of deployment an associated airbag. In general, an inflator containing a primary gas generant 12 and an autoignition composition 14 formed as described herein, may be manufactured as known in the art. U.S. Pat. Nos. 6,422,601, 6,805,377, 6,659,500, 6,749,219, and 6,752,421 exemplify typical airbag inflator designs and are each incorporated herein by reference in their entirety.

Referring now to FIG. 2, the exemplary inflator 10 described above may also be incorporated into an airbag system 200. Airbag system 200 includes at least one airbag 202 and an inflator 10 containing a gas generant composition 12 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 2, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing propellant 12 and autoignition 14 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, each incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

The present description is for illustrative purposes only, and should not be construed to limit the breadth of the present invention in any way. Thus, those skilled in the art will appreciate that various modifications could be made to the presently disclosed embodiments without departing from the scope of the present invention as defined in the appended claims.

What is claimed is:

1. A nitrogen-free autoignition composition consisting of:
 an alkali metal chlorate as an oxidizer provided at about 25-75 weight percent;
 a fuel consisting of D,L-tartaric acid and succinic acid provided at about 25-75 weight percent; and
 a desiccant provided at about 5-35 weight percent, said percentages stated by weight of the total gas generant composition.

2. The composition of claim 1 wherein said alkali metal chlorate is potassium chlorate.

3. The composition of claim 1 wherein said desiccant is selected from the group consisting of silica, zeolite, and calcium oxide.

4. The composition of claim 1 wherein said desiccant is zeolite.

5. The composition of claim 1 wherein said desiccant is selected to provide a mass differential after heat aging at 107 C for 400 hours, of about -5.0% to 5.0 %.

6. A gas generator comprising:
 a nitrogen-free auto-ignition composition consisting of an alkali metal chlorate as an oxidizer provided at about 25-75 weight percent, and one or more carboxylic acids as a fuel provided at about 25-75 weight percent, said percentages stated by weight of the total composition; and
 a zeolite in vapor communication with said composition.

* * * * *